(12) United States Patent
Song (10) Patent No.: US 12,093,291 B2
(45) Date of Patent: Sep. 17, 2024

(54) LONG-TAIL KEYWORD IDENTIFICATION METHOD, KEYWORD SEARCH METHOD, AND COMPUTER APPARATUS

(71) Applicant: SHENZHEN SEKORM COMPONENT NETWORK CO., LTD, Shenzhen (CN)

(72) Inventor: Zilin Song, Shenzhen (CN)

(73) Assignee: SHENZHEN SEKORM COMPONENT NETWORK CO., LTD, Shenzhen (CN)

(*) Notice: Subject to any disclaimer, the term of this patent is extended or adjusted under 35 U.S.C. 154(b) by 170 days.

(21) Appl. No.: 17/553,858

(22) Filed: Dec. 17, 2021

(65) Prior Publication Data
US 2022/0207064 A1   Jun. 30, 2022

(30) Foreign Application Priority Data
Dec. 30, 2020  (CN) .......................... 202011620258.3

(51) Int. Cl.
*G06F 16/332* (2019.01)
*G06F 16/33* (2019.01)
*G06F 16/338* (2019.01)

(52) U.S. Cl.
CPC ........ *G06F 16/332* (2019.01); *G06F 16/3344* (2019.01); *G06F 16/338* (2019.01)

(58) Field of Classification Search
CPC .................................................. G06F 16/332
See application file for complete search history.

(56) References Cited

U.S. PATENT DOCUMENTS 7,870,118 B2 * 1/2011 Jiang ................... G06F 16/3347
707/706
2002/0073079 A1 * 6/2002 Terheggen .......... G06F 16/3328
(Continued)

FOREIGN PATENT DOCUMENTS

CN        103106282 A    5/2013
CN        104268175 A    1/2015

OTHER PUBLICATIONS

The first office action of CN patent application No. 202011620258.3 issued on Jun. 29, 2023.
(Continued)

*Primary Examiner* — Van H Oberly
(74) *Attorney, Agent, or Firm* — Andrew C. Cheng (57) ABSTRACT

The present invention relates to a long-tail keyword identification method, a keyword search method, and a computer apparatus. The long-tail keyword identification method includes: S101, receiving a search keyword, and identifying the number of atomic keywords included in the search keyword by means of a historical lexical database, wherein the historical lexical database comprises multiple atomic keywords and a weight value of each of the atomic keywords; and S102, if the search keyword comprises at least two atomic keywords, treating the search keyword as a combined keyword, and calculating a long-tail weight value for the combined keyword according to the weight values of all the atomic keywords in the combined keyword. The present invention effectively identifies a long-tail keyword, and calculates a long-tail weight value of the long-tail keyword, enhancing the accuracy of hitting a target in a searching process.

9 Claims, 6 Drawing Sheets (56) References Cited

U.S. PATENT DOCUMENTS

2011/0314059 A1* 12/2011 Hu ..................... G06F 16/951
                                                707/E17.014
2020/0193500 A1    6/2020 Chen

OTHER PUBLICATIONS

The search report of CN patent application No. 202011620258.3 issued on Jun. 29, 2023.
The office action of JP patent application No. 2021-209618 issued on Mar. 28, 2023.
The extended European search report of EP patent application No. 21216420.6 issued on Apr. 4, 2022.

* cited by examiner

Fig. 1

Receiving a search keyword, and identifying the number of atomic keywords included in the search keyword by means of a historical lexical database, wherein the historical lexical database comprises multiple atomic keywords and a weight value of each of the atomic keywords ⎯S101

If the search keyword comprises at least two atomic keywords, treating the search keyword as a combined keyword, and calculating a long-tail weight value for the combined keyword according to the weight values of all the atomic keywords in the combined keyword ⎯S102

LONG-TAIL KEYWORD IDENTIFICATION METHOD, KEYWORD SEARCH METHOD, AND COMPUTER APPARATUS

FIELD OF THE INVENTION

The present invention relates to the field of search, and more particularly to a long-tail keyword identification method, a keyword search method, and a computer apparatus.

DESCRIPTION OF THE RELATED ART

Figure 1:
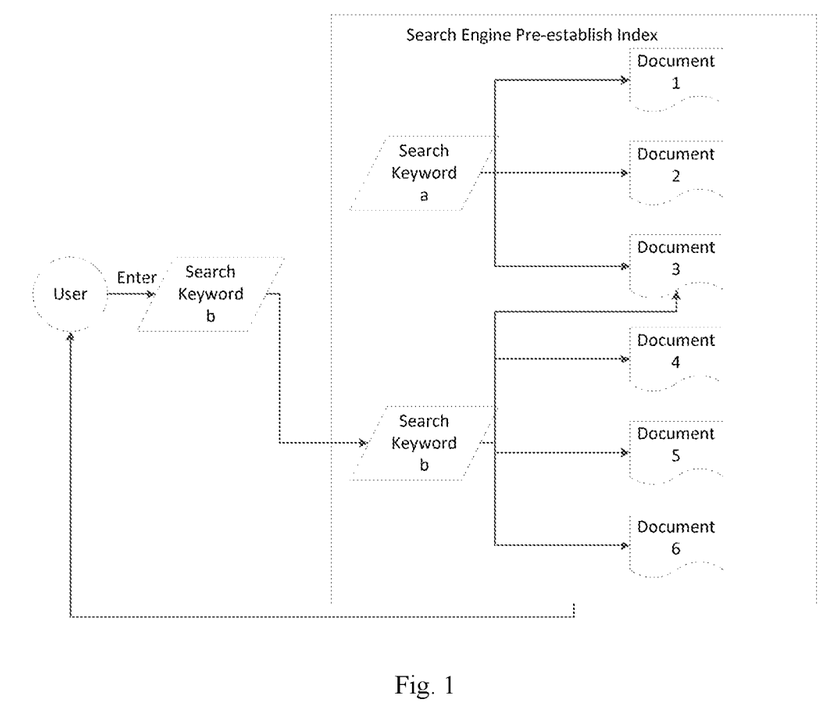
FIG. 1 is a flow chart illustrating a long-tail keyword identification method provided in an embodiment.

Users retrieve all sorts of information from the Internet, often by entering one or more search keywords to acquire related information by means of search engines. For example, referring to FIG. 1, a search engine includes a pre-established corresponding relationship of search keyword a and search keyboard b in that the search keyword a corresponds to document 1, document 2, and document 3; and search keyword b corresponds to document 3, document 4, document 5, and document 6. When a user inputs the search keyword b, the search engine searches out the document 3, document 4, document 5, and document 6 to which the search keyword b corresponds according to the pre-established corresponding relationship of the search keyword a and the search keyword b.

When a user enters two or more than two search keywords at the same time, for a situation that the search engine does not include data matching with all the search keywords, it has been a long-term existing problem in the field of search as to how priority ranking can be conducted for the data to which various ones of the search keywords correspond in order to provide to the user a result that is better fit in with what is expected. The known techniques simply identify the long-tail attribute of search keywords based on the number of characters included in each search keyword, and such a methodology may easily incur erroneous identification and search accuracy is poor.

SUMMARY OF THE INVENTION

The present invention is directed to a long-tail keyword identification method, a keyword search method, and a computer apparatus.

In one aspect, a long-tail keyword identification method comprises:

S101, receiving a search keyword, and identifying the number of atomic keywords included in the search keyword by means of a historical lexical database, wherein the historical lexical database comprises multiple atomic keywords and a weight value of each of the atomic keywords; and S102, if the search keyword comprises at least two atomic keywords, treating the search keyword as a combined keyword, and calculating a long-tail weight value for the combined keyword according to the weight values of all the atomic keywords in the combined keyword.

In some embodiments, in the long-tail keyword identification method, in Step S102, calculating a long-tail weight value for the combined keyword according to the weight values of all the atomic keywords in the combined keyword comprises:

S1021, determining whether or not a lexical inclusion relationship is present among all the atomic keywords of the combined keyword;

S1022, if yes, removing atomic keywords of which the weight values are low from the atomic keywords corresponding to the lexical inclusion relationship, and preserving atomic keywords of which the weight values are high; and S1023, calculating the long-tail weight value for the combined keyword according to the weight values of remaining atomic keywords of the combined keyword.

In some embodiments, the long-tail keyword identification method further comprises, after Step S1022 and before Step S1023:

S1024, determining a number of the preserved atomic keywords of the combined keyword;

S1025, if at least two atomic keywords are preserved, executing Step S1023; and

S1026, if one atomic keyword is preserved, treating the search keyword as an atomic keyword to be stored in the historical lexical database, and providing a corresponding weight value.

In some embodiments, in the long-tail keyword identification method, Step S1023 comprises: taking a sum of the weight values of the remaining atomic keywords of the combined keyword as the long-tail weight value of the combined keyword.

In some embodiments, the long-tail keyword identification method further comprises, after Step S101:

S103, if the search keyword comprises one atomic keyword, treating the search keyword as an atomic keyword to be stored in the historical lexical database, and providing a corresponding weight value.

In some embodiments, in the long-tail keyword identification method, in Step S102, calculating a long-tail weight value for the combined keyword according to the weight values of all the atomic keywords in the combined keyword comprises:

taking a sum of the weight values of all the atomic keywords of the combined keyword as the long-tail weight value of the combined keyword.

In another aspect, a keyword search method comprises:

S201, a search block receiving at least two search keywords inputted by a user; and S202, implementing the long-tail keyword identification method as described above to calculate the long-tail weight value for each of the search keywords.

In some embodiments, the keyword search method further comprises, after Step S202:

S203, taking a search keyword having a maximum long-tail weight value as a long-tail keyword, and seeking for a search result that corresponds to the long-tail keyword.

In some embodiments, the keyword search method further comprises, after Step S202:

S204, seeking for a search result that corresponds to each of the search keywords, and ranking the search results from high to low according to the long-tail weight values.

In still another aspect, a computer apparatus comprises a storage and a processor;

the storage storing a computer program; and the processor executing the computer program stored in the storage, in order to implement the long-tail keyword identification method as described above or the keyword search method as described above.

Implementation of the long-tail keyword identification method, the keyword search method, and the computer apparatus according to the present invention provides the following beneficial effects. The present invention can effectively identify a long-tail keyword, and calculates a long-tail weight value of the long-tail keyword, enhancing the accuracy of hitting a target in a searching process.

BRIEF DESCRIPTION OF THE DRAWINGS

A detailed description of the present invention will be provided below with reference to the attached drawings and embodiments, and in the drawings.

DETAILED DESCRIPTION OF PREFERRED EMBODIMENTS OF THE INVENTION

For better understanding of the technical features, purposes, and efficacy of the present invention, embodiments of the present invention will be described in detail with reference to the drawings.

Figure 2:
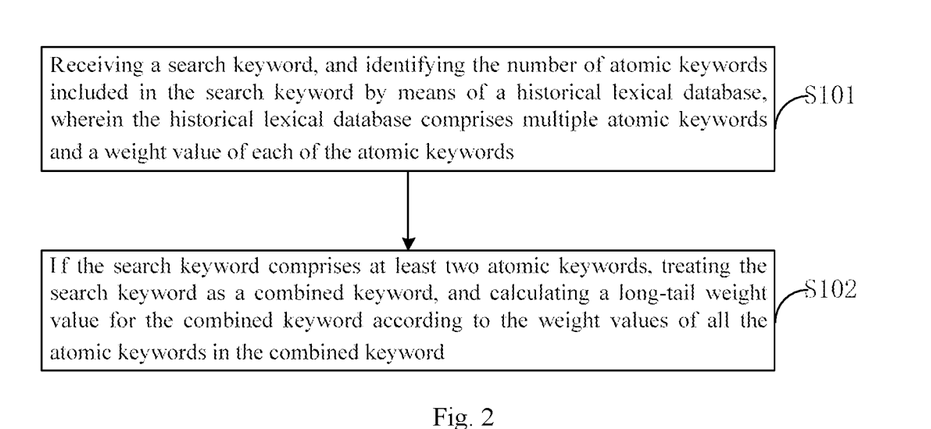
FIG. 2 is a flow chart illustrating a long-tail keyword identification method provided in an embodiment.

In a preferred embodiment, referring to FIG. 2, a long-tail keyword identification method according to the instant embodiment comprises the following steps:

S101, receiving a search keyword, and identifying the number of atomic keywords included in the search keyword by means of a historical lexical database, wherein the historical lexical database comprises multiple atomic keywords and a weight value of each of the atomic keywords. The atomic keywords of the historical lexical database can be established manually or by means of machine learning, and each of the atomic keywords has a weight value corresponding thereto. Upon receipt of the search keyword, the search keyword is subjected to splitting according to the atomic keywords stored in the historical lexical database, in order to obtain one or multiple atomic keywords corresponding to the search keyword. A lexical inclusion relationship may be present in the course of splitting, namely one of the atomic keywords includes another one of the atomic keywords. For example, a search keyword is "industrial controller", in which "controller" and "control" are both atomic keywords, and "controller" and "control" form a lexical inclusion relationship, namely "controller" includes "control". It is appreciated that not each word included in the search keyword has a corresponding atomic keyword. For example, a search keyword is "controller", while the historical lexical database only includes "control" as an atomic keyword, then the atomic keyword corresponding to the search keyword "controller" is "control".

S102, if the search keyword comprises at least two atomic keywords, treating the search keyword as a combined keyword, and calculating a long-tail weight value for the combined keyword according to the weight values of all the atomic keywords in the combined keyword. Splitting a search keyword into atomic keywords would provide one or multiple atomic keywords, and if the search keyword comprises at least two atomic keywords, and the search keyword is treated as a combined keyword, and a long-tail weight value of the combined keyword is calculated according to the weight values of all the atomic keywords included in the combined keyword. Optionally, a sum of the weight values of all the atomic keywords of the combined keyword is taken as the long-tail weight value of the combined keyword, but it is also possible to use other ways of calculation to calculate the long-tail weight value that the weight values of all the atomic keywords of the combined keyword correspond to.

The instant embodiment can effectively identify a long-tail keyword, and calculates a long-tail weight value of the long-tail keyword, enhancing the accuracy of hitting a target in a searching process.

Figure 3:
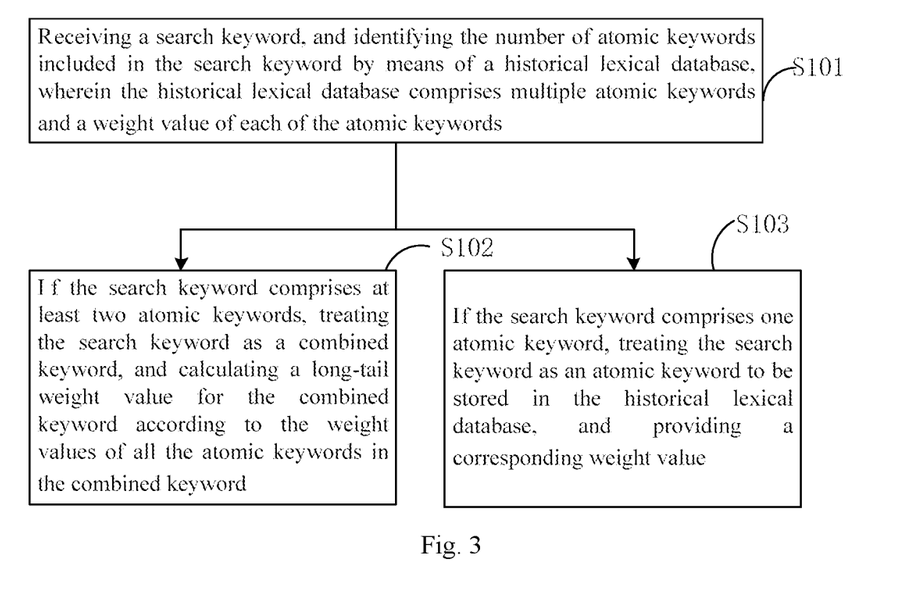
FIG. 3 is a flow chart illustrating a long-tail keyword identification method provided in an embodiment.

In some embodiments, referring to FIG. 3, the long-tail keyword identification method according to the instant embodiment further comprises, after Step S101:

S103, if the search keyword comprises one atomic keyword, treating the search keyword as an atomic keyword to be stored in the historical lexical database, and providing a corresponding weight value. Splitting a search keyword into atomic keywords would provide one or multiple atomic keywords, and if the search keyword comprises one atomic keyword, then the search keyword is taken as an atomic keyword to be stored in the historical lexical database, and a corresponding weight value is provided. For example, a search keyword is "controller", while the historical lexical database only includes "control" as an atomic keyword, then the search keyword "controller" is treated as a new atomic keyword to be stored in the historical lexical database, and a corresponding weight value is provided. Long-term accumulation through user's input allows the historical lexical database to be more suitable to user's habit.

Figure 4:
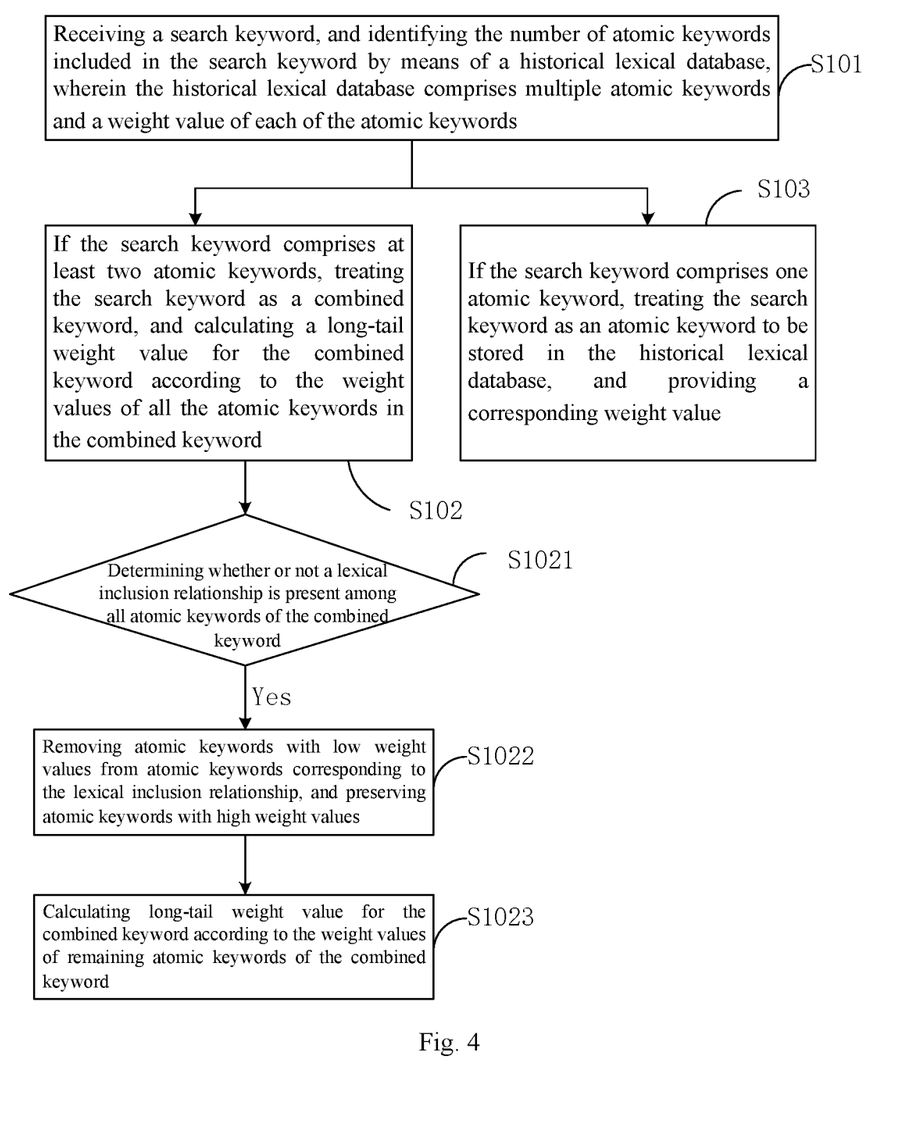
FIG. 4 is a flow chart illustrating a long-tail keyword identification method provided in an embodiment.

In some embodiments, referring to FIG. 4, in a long-tail keyword identification method according to the instant embodiment, calculating a long-tail weight value of the combined keyword according to the weight values of all the atomic keywords in the combined keyword of Step S102 comprises:

S1021, determining whether or not a lexical inclusion relationship is present among all the atomic keywords of the combined keyword. A lexical inclusion relationship may be present in the course of splitting, namely one of atomic keywords includes another one of the atomic keywords. For example, a search keyword is "industrial controller", in which "controller" and "control" are both atomic keywords, and "controller" and "control" form a lexical inclusion relationship, namely "controller" includes "control".

S1022, if the lexical inclusion relationship is present among all the atomic keywords of the combined keyword, removing atomic keywords with low weight values from the atomic keywords corresponding to the lexical inclusion relationship, and preserving atomic keywords with high weight values. It is noted that the instant embodiment does not execute removal according to the number of characters that an atomic keyword includes, meaning not necessarily to remove atomic keywords having less characters, and instead, the weight value of the atomic keyword is taken as a reference for removal, meaning the weight values of all atomic keywords of the combined keyword are compared with each other, and atomic keywords with low weight values are removed from the atomic keywords corresponding to the lexical inclusion relationship and atomic keywords with high weight values are preserved. For example, atomic keywords "controller" and "control" form a lexical inclusion relationship, and if the weight value of "controller" is greater than the weight value of "control", then the atomic keyword "control" is removed; and if the weight value of "controller" is less than the weight value of "control", then the atomic keywords "controller" is removed.

S1023, calculating the long-tail weight value for the combined keyword according to the weight values of remaining atomic keywords of the combined keyword. After the removal of a portion of the atomic keywords, the long-tail weight value of the combined keyword is calculated according to the remaining ones of the atomic keywords of the combined keyword. Optionally, a sum of the weight values of the remaining atomic keywords of the combined keyword is taken as the long-tail weight value of the combined keyword, but it is also possible to use other ways of calculation to calculate the long-tail weight value that the weight values of the remaining atomic keywords of the combined keyword correspond to.

The instant embodiment takes further consideration of a lexical inclusion relationship present among the atomic keywords, and removes atomic keywords of low weight values, in order to ensure a search range is even more precise to enhance the accuracy of hitting a target in a searching process.

Figure 5:
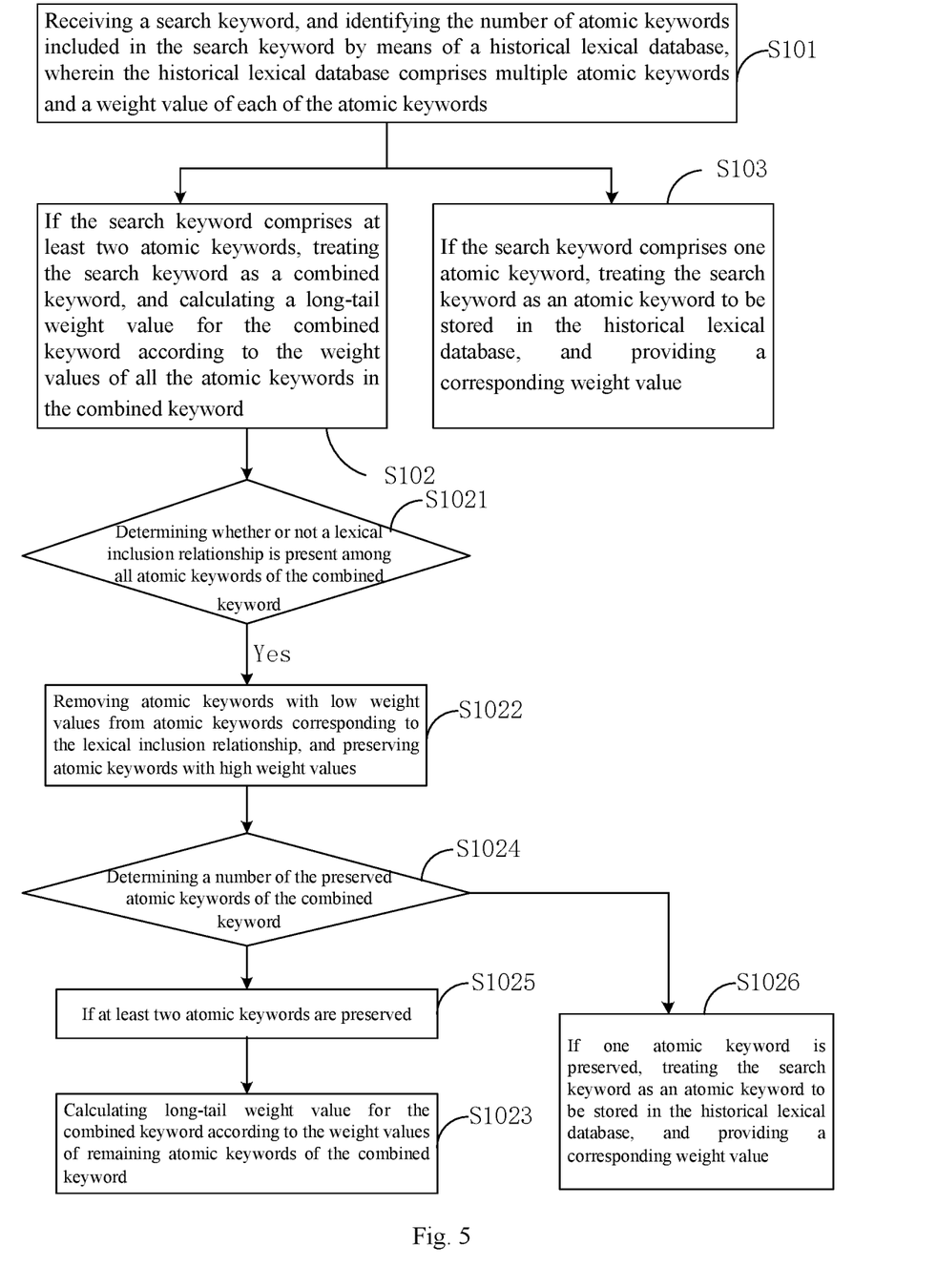
FIG. 5 is a flow chart illustrating a keyword search method provided in an embodiment.

In some embodiments, referring to FIG. 5, a long-tail keyword identification method according to the instant embodiment further comprises, after Step S1022 and before Step S1023:

S1024, determining a number of the preserved atomic keywords of the combined keyword. After the removal of a portion of the atomic keywords, there may be one or multiple the atomic keywords preserved in the combined keyword.

S1025, if at least two atomic keywords are preserved, executing Step S1023.

S1026, if one atomic keyword is preserved, treating the search keyword as an atomic keyword to be stored in the historical lexical database, and providing a corresponding weight value.

Figure 6:
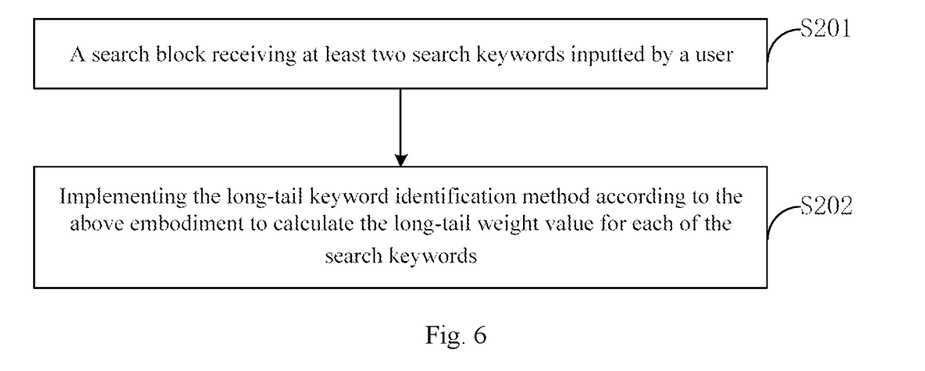
FIG. 6 is a flow chart illustrating a keyword search method provided in an embodiment.

In a preferred embodiment, referring to FIG. 6, the instant embodiment further provides a keyword search method, which comprises:

S201, a search block receiving at least two search keywords inputted by a user. A search block is an entry portal for search, and a user may enter desired contents for search in the search block, and different search keywords may be distinguished by means of a space or other preset separation character. The long-tail keyword identification method provided in the above embodiments is implemented, only in case that two or more than two search keywords have been identified, to calculate the long-tail weight value for each of the search keywords. If the user enters just one search keyword, then searching can be conducted using the known techniques.

S202, implementing the long-tail keyword identification method provided in the above embodiments to calculate the long-tail weight value for each of the search keywords.

The instant embodiment can effectively identify a long-tail keyword, and calculates a long-tail weight value of the long-tail keyword, enhancing the accuracy of hitting a target in a searching process.

Figure 7:
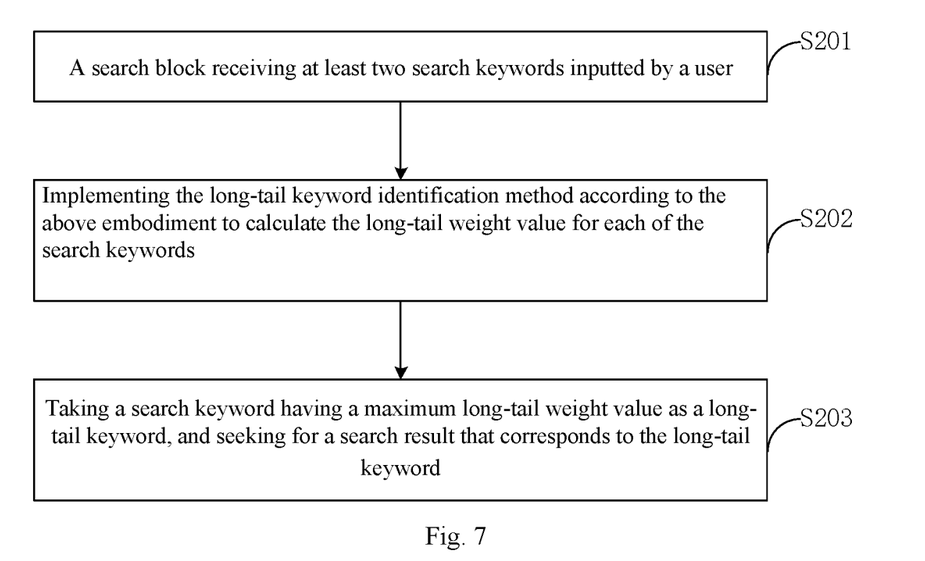
FIG. 7 is a flow chart illustrating a keyword search method provided in an embodiment.

In some embodiments, referring to FIG. 7, the keyword search method according to the instant embodiment further comprises, after Step S202: S203, taking a search keyword having a maximum long-tail weight value as a long-tail keyword, and seeking for a search result that corresponds to the long-tail keyword. The instant embodiment carries out searching by selecting a search keyword having the maximum long-tail weight value, so that a search range is made minimum and precise. A backstage server stores the contents corresponding to each long-tail keyword, and the backstage server seeks for the search result that corresponds to the long-tail keyword for returning to the browser to be reviewed by the user.

Figure 8:
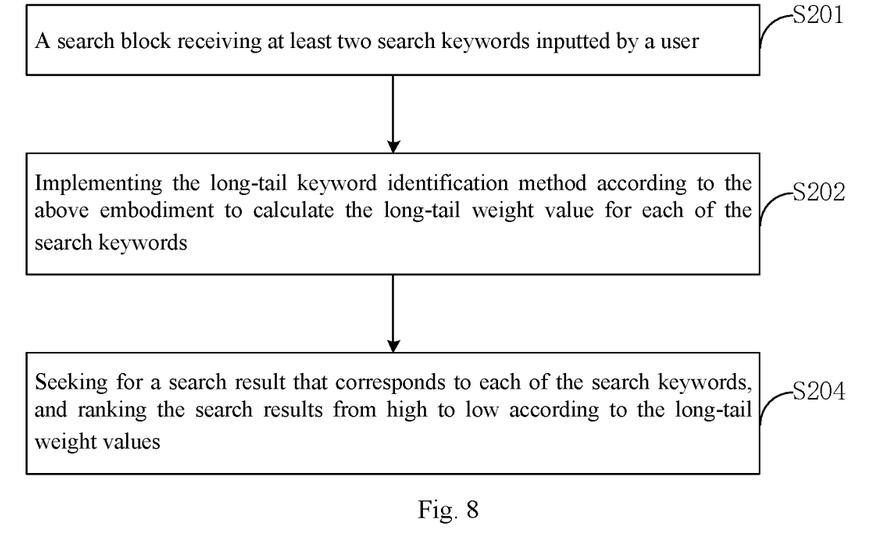
FIG. 8 is a flow chart illustrating a keyword search method provided in an embodiment.

In some embodiments, referring to FIG. 8, the keyword search method according to the instant embodiment further comprises, after Step S202: S204, seeking for a search result that corresponds to each of the search keywords, and ranking the search results from high to low according to the long-tail weight values. For some search keywords, if only the search keyword having the maximum long-tail weight value is used, there may be a situation that only a few search results are hit, and thus, a strategy that searching is conducted for all the search keywords may be adopted, but ranking of the search results is necessary, meaning ranking the search results from high to low according to the long-tail weight values. Ranking the search result from high to low according to the long-tail weight values allows the contents that a user is desired to see to be ranked at the beginning to ease reviewing by the user.

In a preferred embodiment, a computer apparatus according to the instant embodiment comprises a storage and a processor. The storage stores a computer program; and the processor executes the computer program stored in the storage, in order to implement a long-tail keyword identification method described in the above embodiments or a keyword search method described in the above embodiments.

A progressive way is adopted to illustrate various embodiments of the disclosure. The description of each embodiment focuses on key features that are different from those of other embodiments. Similar parts of the various embodiments may refer to each other. For the devices disclosed in the embodiments, since they are corresponding to the methods disclosed in the embodiments, and the descriptions thereof are relatively simplified, and the related parts may refer to the descriptions of the methods.

Skilled artisans may further notice that the units and method steps of each example of the embodiments disclosed in this disclosure can be implemented in hardware or computer software or a combination of the two. To clearly illustrate the exchangeability of hardware and software, the illustration provided above demonstrates the components and steps of each example with a general description according to functions thereof. Whether such functions can be implemented with hardware or software is determined by the specific application and design requirement conditions of the technical solution. Skilled artisans may adopt different ways to implement the functions so described for each specific application, and such implementations should not be regarded as exceeding the scope of the present invention.

The steps of the method or algorithm described with reference to the embodiments disclosed in the disclosure can be implemented directly by means of hardware, or by means of software modules executable in a processor, or a combination of the two. The software modules may be loaded in a random access memory (RAM), an internal storage, a read only memory (ROM), an electrically programmable ROM, an electrically erasable ROM, a register, a hard disc drive, a mobile magnetic drive, a CD-ROM, or any other forms of storage medium known in the field.

The embodiments provided above are only for illustration of the technical thoughts and features of the present invention, for the purposes to help those skilled in the art to understand the contents of the present invention and to accordingly put into practice, and should not be construed as limiting to the scope of protection for the present invention. All variations and modifications that are considered equivalent to the scope of the appended claims of the application belong to the scope of the present invention as defined solely by the appended claims.

What is claimed is:

1. A long-tail keyword identification method, comprising:
   S101, receiving a search keyword, and identifying the number of atomic keywords included in the search keyword by means of a historical lexical database, wherein the historical lexical database comprises multiple atomic keywords and a weight value of each of the atomic keywords; and
   S102, if the search keyword comprises at least two atomic keywords, treating the search keyword as a combined keyword, and calculating a long-tail weight value for the combined keyword according to the weight values of all the atomic keywords in the combined keyword,
   wherein, in Step S102, calculating a long-tail weight value for the combined keyword according to the weight values of all the atomic keywords in the combined keyword comprises:
   S1021, determining whether or not a lexical inclusion relationship is present among all the atomic keywords of the combined keyword;
   S1022, if yes, removing atomic keywords with low weight values from the atomic keywords corresponding to the lexical inclusion relationship, and preserving atomic keywords with high weight values; and
   S1023, calculating the long-tail weight value for the combined keyword according to the weight values of remaining atomic keywords of the combined keyword.

2. The long-tail keyword identification method according to claim 1, further comprising, after Step S1022 and before Step S1023:
   S1024, determining a number of the preserved atomic keywords of the combined keyword;
   S1025, if at least two atomic keywords are preserved, executing Step S1023; and
   S1026, if one atomic keyword is preserved, treating the search keyword as an atomic keyword to be stored in the historical lexical database, and providing a corresponding weight value.

3. The long-tail keyword identification method according to claim 1, wherein, Step S1023 comprises: taking a sum of the weight values of the remaining atomic keywords of the combined keyword as the long-tail weight value of the combined keyword.

4. The long-tail keyword identification method according to claim 1, further comprising, after Step S101:
   S103, if the search keyword comprises one atomic keyword, treating the search keyword as an atomic keyword to be stored in the historical lexical database, and providing a corresponding weight value.

5. The long-tail keyword identification method according to claim 1, wherein, in Step S102, calculating a long-tail weight value for the combined keyword according to the weight values of all the atomic keywords in the combined keyword comprises:
   taking a sum of the weight values of all the atomic keywords of the combined keyword as the long-tail weight value of the combined keyword.

6. A keyword search method, comprising:
   S201, a search block receiving at least two search keywords inputted by a user; and
   S202, implementing the long-tail keyword identification method according to claim 1 to calculate the long-tail weight value for each of the search keywords.

7. The keyword search method according to claim 6, further comprising, after Step S202:
   S203, taking a search keyword having a maximum long-tail weight value as a long-tail keyword, and seeking for a search result that corresponds to the long-tail keyword.

8. The keyword search method according to claim 6, further comprising, after Step S202:
   S204, seeking for a search result that corresponds to each of the search keywords, and ranking the search results from high to low according to the long-tail weight values.

9. A computer apparatus, comprising a storage and a processor;
   the storage storing a computer program; and
   the processor executing the computer program stored in the storage, in order to implement the long-tail keyword identification method according to claim 1.

* * * * *